No. 686,832. Patented Nov. 19, 1901.
J. D. PEACHEY.
ELECTRIC CONDUCTING CABLE.
(Application filed Sept. 21, 1900.)
(No Model.)
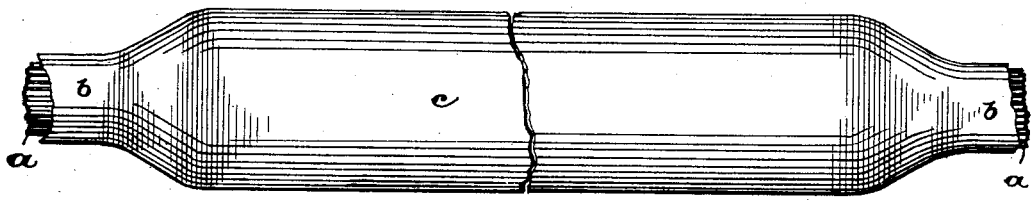
Fig. 1.
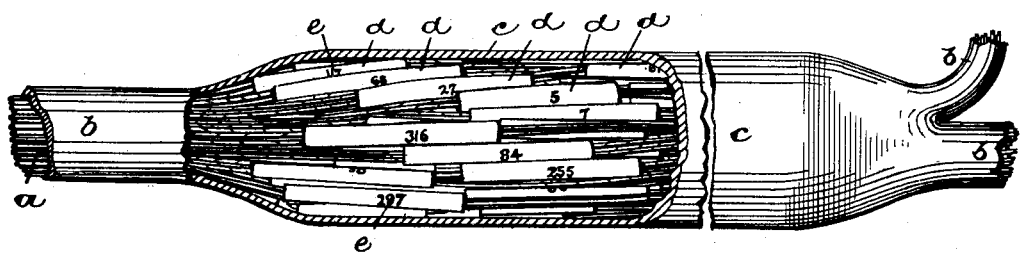
Fig. 2.
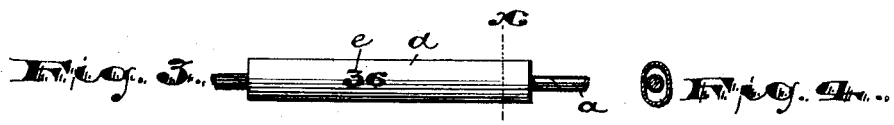
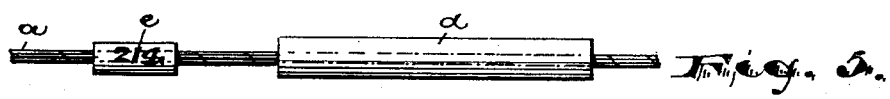
WITNESSES:
C. B. Pitney.
Henry Krug
INVENTOR:
John D. Peachey,
BY
Drake & Co.
ATTORNEYS
THE NORRIS PETERS CO., PHOTO-LITHO., WASHINGTON, D. C.

UNITED STATES PATENT OFFICE.

JOHN D. PEACHEY, OF NEWARK, NEW JERSEY.

ELECTRIC CONDUCTING-CABLE.

SPECIFICATION forming part of Letters Patent No. 686,832, dated November 19, 1901.

Application filed September 21, 1900. Serial No. 30,712. (No model.)

*To all whom it may concern:*

Be it known that I, JOHN D. PEACHEY, a citizen of the United States, residing at Newark, in the county of Essex and State of New Jersey, have invented certain new and useful Improvements in Electric Conducting-Cables; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to facilitate the work of making wire connections in connection with telephone and telegraph systems, particularly in cases where a large number of lines are arranged together in a cable, to prevent or greatly reduce the confusion and other disadvantages due to the long period heretofore required in making the tests preliminary to making such connections, to enable individual conductors to be identified quickly and with certainty even after the cable has been suspended or placed in operative position under exposure to dampness or atmospheric influences, and to secure other advantages and results, some of which may be referred to hereinafter in connection with the description of the working parts.

The invention consists in the arrangements and combinations of parts of the same, all substantially as will be hereinafter set forth, and finally embraced in the clauses of the claim.

Referring to the accompanying drawings, in which like letters of reference indicate corresponding parts in each of the several views, Figure 1 is a side elevation of what is commonly known as a "straight" splice. Fig. 2 is an elevation of a branch or tap splice of a cable, telegraphic or telephonic, the same being broken away to show more clearly the features of novelty therein. Fig. 3 is an elevation of an individual wire, showing an insulated sleeve covering the exposed ends of the connections or joints in said wire. Fig. 4 is a section of the same, taken at line $x$; and Fig. 5 shows a modified construction, as will be hereinafter described.

In said drawings, $a\,a$ indicate collections of electrical conducting-wires, each wire being suitably provided with an insulating jacket or covering, said wires being united or held together to form cables. $b\,b$ are lead tubes inclosing said cables and holding the wires thereof together.

$c$ is a splice-tube, also preferably of lead and of a larger diameter than the tubes $b\,b$ and being at its opposite ends soldered to the smaller tubes $b\,b$ to prevent the introduction of moisture or dampness to the interior. Within the enlarged tube or splice-tube the ends of the meeting wires are joined and the connections are each covered by an insulating-sleeve $d$, by means of which the joints are each protected from contact with other similar joints within the splice.

It has been heretofore the practice in connection with telephone systems to number the wires at some central point, such as the central office, for convenience in giving the instructions to the employees and making records, &c. In making new connections with one or more of the wires of a cable distant from the office or central point referred to it has been heretofore necessary when changing a branch or tap from one main cable or "complement" to another after removing the lead sleeve and loosening the several wires from the filling of paraffin commonly employed to test the wires individually by means of a suitable instrument, this action of testing continuing until the wires to be connected are discovered. This operation of testing is oftentimes extremely tedious and laborious, so that the connections are made at great expense and with great difficulty, and, furthermore, because of the time occupied in making such tests the interruption to the systematic working at the office is great and troublesome, for reasons that will be readily understood. By my present invention I avoid all such testing and am enabled to at once select the wires to be connected. I accomplish these results by putting upon the several sleeves at the splice identifying-marks, such as the numbers $e$, and these identifying-marks correspond, preferably, with the numbers upon the wires at the central office, and thus the workmen after opening the splice will be enabled to make the selection referred to. I may place these numbers or identifying-marks upon the sleeves covering the exposed ends of the individual wires at the joint thereon, or, as illustrated in Fig. 5, the numbers may be imprinted on or applied to a special tube-like sleeve inclosing the wires, as shown. By making the identifying device in the form of a sleeve I am enabled to thus identify the wires without increasing the bulk of the cable or so that the splice is not as a whole increased in diameter; neither is the operation of loosening the wires preliminary to making a connection interfered with. The sleeves being marked with identifying-numbers and being placed in position to cover the joints, the large splice-tube c is placed over the collection of marked sleeves and is then soldered to the smaller tubes b b, and thus said marks of identification are fully protected from dampness or atmospheric influences, and even should the splice-tube not be open for years, yet upon a pressing or other occasion when said tube is opened for purposes of testing the marks will be preserved and in condition to be clearly and easily recognized and the wires identified.

Having thus described the invention, what I claim as new is—

1. The combination with an electrical cable composed of a multiplicity of insulated wires each carrying a local mark of identification, of a hermetically-sealed inclosure for protecting and preserving said marks of identification.

2. The combination with electrical cables inclosed in lead tubes, each cable consisting of a multiplicity of insulated wires, the wires of the cables being joined, the wire of one cable with a corresponding wire in the other, the joined wires at each joint carrying a sleeve movable lengthwise to and from the joint and the said sleeves being each provided with a local mark of identification, of a splice-tube larger than the tubes covering said cables and soldered at its opposite ends to the last said tubes and hermetically inclosing and sealing the identified wires and protecting and preserving the marks of identification, substantially as set forth.

In testimony that I claim the foregoing I have hereunto set my hand this 15th day of September, 1900.

JOHN D. PEACHEY.

Witnesses:
   CHARLES H. PELL,
   C. B. PITNEY.